Patented Apr. 16, 1935

1,997,925

UNITED STATES PATENT OFFICE 1,997,925

PROCESS FOR MAKING PIGMENTS

Alwin C. Eide, Columbus, Ohio, assignor to American Zinc, Lead & Smelting Company, St. Louis, Mo., a corporation of Maine No Drawing. Application August 10, 1932, Serial No. 628,263

9 Claims. (Cl. 134—78)

This invention relates to a process for making pigments, and more particularly zinc oxide in finely divided form suitable for use as a pigment.

In many instances pigments are required to be incorporated in rubber and in such cases the dispersion of the pigment particles in the rubber becomes of considerable importance. Some pigments, as for example zinc oxide made according to the so-called American process wherein the zinc oxide is formed directly from ores, do not always mix readily into rubber, the difficulty being apparently due in large part to surface characteristics of the pigment particles. It has been found that if the particles are surface-treated with a material such as a fatty acid, the pigment mixes into rubber more readily especially in internal mixers such as the Banbury mixer and because of the better dispersion of the pigment particles the resultant product may have higher tensile strength and abrasion resistance, better electrical properties, etc. in some compositions.

One of the objects of the invention is to provide a novel process of producing a pigment such as zinc oxide having its particles substantially uniformly coated on their surfaces with a suitable fatty acid such as stearic acid or lauric acid. Other objects will appear more fully hereinafter.

The zinc is first recovered from the zinc-bearing starting material such as zinc ore in the form of zinc oxide, preferably by volatilizing the zinc and then bringing it into contact with air. Where zinc ore is used, it is first roasted and a mixture of coal and roasted ore is then spread on a flat grate. Air under pressure is admitted below the grate and suction above the grate withdraws the products of combustion. The temperature of the grate is maintained at above 1000° C. so that the oxidized zinc in the ore which is reduced to metallic zinc, is volatilized, the zinc vapor going off as a colorless transparent gas. At a suitable point beyond the zone of reduction, air is admitted so that the zinc vapor burns to zinc oxide. The products of combustion are then carried under suction through a long pipe usually referred to as the "trail" and after passing through a settling chamber or separator are conducted to a bag room where the particles of zinc oxide are separated from the gases.

Due to the frequent presence of some sulphur in the ore or other starting material, the particles of zinc oxide often adsorb a certain amount of sulphur gases and moreover the zinc oxide may contain black specks of carbonaceous material. Accordingly the zinc oxide collected in the bag room is next subjected to a reheat in the neighborhood of 600° C. which oxidizes any carbonaceous materials present and reduces the amount of acidic material to a more uniform quantity.

A suitable fatty acid or other material is added to the zinc oxide as it cools down to a suitable temperature following the reheating or refining operation. Preferably the fatty acid is added in a finely divided form by means of an atomizer but it may be added by dusting in finely powdered acid or in any other suitable way. The addition of the fatty acid is made at a temperature such that the acid is evaporated as it strikes the oxide. As the oxide continues to cool and the temperature decreases, the fatty acid then condenses in a uniform thin layer on the surfaces of the individual particles of pigment.

Generally speaking, any of the fatty acids can be employed for coating purposes but because of their commercial availability, lauric and stearic acids are preferred. While the amount of acid to be added may also vary somewhat, it should not exceed a maximum of approximately 1% of the zinc oxide. A range of from .2% to 1% has been found suitable for the purposes of the invention.

The temperature of the zinc oxide at which the fatty acid is added will also vary depending upon the particular acid employed. In general, the temperatures should not be so high as to result in decomposition of the fatty acid but should be high enough to result in vaporization of the fatty acid as it strikes the oxide. A temperature range of 150° C. to 300° C. may be stated as suitable for obtaining the desired results.

Zinc oxide prepared in this manner is found to be in finely divided pigment form, the individual particles being substantially uniformly coated with the fatty acid so that the pigment mixes or disperses in rubber very readily. The coating of fatty acid does not detract from the pigment properties of the material but apparently causes the zinc oxide particles to lose their usual surface characteristics and to take on instead the characteristics of the coating material which, being organic and somewhat similar to the rubber, can be incorporated therein without difficulty. The better dispersion of the zinc oxide particles may result in higher tensile strength and abrasion resistance and in better electrical properties of the final rubber product.

It will be understood that the invention is not limited to the specific materials, temperatures, proportions, or procedure set out above by way of illustration and that these various factors are capable of variation. In general, any suitable fatty acid can be employed and moreover the proportions of fatty acid and temperatures at which the acid is added will be understood to be variable within the limits stated above. It will also be apparent to those skilled in the art that the temperature employed will depend to some extent upon the particular fatty acid to be added since the fatty acids vary in their volatilization temperatures. Reference is therefore to be had to the appended claims for a definition of the limits of the invention.

What is claimed is:

1. A process for making zinc oxide pigment which consists in vaporizing and oxidizing zinc, reheating the zinc oxide in order to remove impurities therefrom, cooling the reheated zinc oxide, and adding a fatty acid thereto when the oxide has cooled to a temperature between 150° and 300° C.

2. A process for making zinc oxide pigment which consists in vaporizing and oxidizing zinc, collecting the zinc oxide particles, reheating the zinc oxide particles in a refining operation, cooling the refined zinc oxide to a temperature between 150° and 300° C., then adding a fatty acid to the cooled zinc oxide, and then cooling the zinc oxide and fatty acid together whereby the acid condenses on the surfaces of the individual particles.

3. A process for making zinc oxide pigment which consists in vaporizing and oxidizing zinc, reheating the zinc oxide particles in a refining operation, gradually cooling the refined zinc oxide, and adding a fatty acid to the zinc oxide as it cools after the refining operation to a temperature at which the fatty acid is vaporized but not decomposed.

4. A process for making zinc oxide pigment which consists in vaporizing and oxidizing zinc, collecting the zinc oxide particles, reheating the zinc oxide particles to a temperature of about 600° C. in a refining operation, cooling the refined zinc oxide, and adding a fatty acid to the zinc oxide after it has cooled to a temperature at which the fatty acid is vaporized but not decomposed, the fatty acid condensing on the zinc oxide particles on further cooling.

5. A process for making zinc oxide pigment which consists in vaporizing and oxidizing zinc, collecting the zinc oxide particles, reheating the zinc oxide particles to a temperature of about 600° C. in a refining operation, cooling the refined zinc oxide, and adding a fatty acid to the zinc oxide after it has cooled to a temperature between 150° C. and 300° C., whereby said fatty acid is vaporized and condenses on the zinc oxide particles on further cooling.

6. A process for making zinc oxide pigment which consists in vaporizing and oxidizing zinc, reheating the zinc oxide particles to a temperature sufficient to remove impurities therefrom, cooling the reheated zinc oxide, and adding from 0.2% to 1.0% of a fatty acid to the zinc oxide after it has cooled to a temperature at which the fatty acid is vaporized but not decomposed, whereby the fatty acid condenses on the zinc oxide particles on further cooling.

7. A process for making zinc oxide pigment which consists in vaporizing and oxidizing zinc, reheating the zinc oxide particles to a temperature sufficient to remove impurities therefrom, cooling the reheated zinc oxide, and adding from 0.2% to 1.0% of stearic acid to the zinc oxide after it has cooled to a temperature between 150° C. and 300° C.

8. A process for making zinc oxide pigment which consists in vaporizing and oxidizing zinc, reheating the zinc oxide particles to a temperature sufficient to remove impurities therefrom, cooling the reheated zinc oxide, and adding from 0.2% to 1.0% of lauric acid to the zinc oxide after it has cooled to a temperature between 150° C. to 300° C.

9. The process of making zinc oxide coated with a fatty acid which consists in vaporizing and oxidizing zinc, reheating the zinc oxide, regulating the temperature of the reheated zinc oxide to a point where it will vaporize without decomposing the fatty acid, then adding the fatty acid, and then cooling the zinc oxide and fatty acid together, whereby the acid is caused to condense on the individual particles of zinc oxide.

ALWIN C. EIDE.